US009190703B2

(12) United States Patent
Weiss

(10) Patent No.: US 9,190,703 B2
(45) Date of Patent: Nov. 17, 2015

(54) SUPPORT DISC FOR SUPPORTING HIGH FREQUENCY (HF) COMPONENTS

(75) Inventor: Frank Weiss, Bernsdorf (DE)

(73) Assignee: Rosenberger Hochfrequenztechnik GmbH & Co. KG, Fridolfing (DE)

(*) Notice: Subject to any disclaimer, the term of this patent is extended or adjusted under 35 U.S.C. 154(b) by 1098 days.

(21) Appl. No.: 13/256,853

(22) PCT Filed: Feb. 11, 2010

(86) PCT No.: PCT/EP2010/000856
§ 371 (c)(1),
(2), (4) Date: Sep. 15, 2011

(87) PCT Pub. No.: WO2010/105720
PCT Pub. Date: Sep. 23, 2010

(65) Prior Publication Data
US 2012/0001032 A1 Jan. 5, 2012

(30) Foreign Application Priority Data
Mar. 16, 2009 (DE) ..................... 20 2009 003 687 U

(51) Int. Cl.

| | |
|---|---|
| ***F16L 5/00*** | (2006.01) |
| ***H01P 3/06*** | (2006.01) |
| ***H01B 11/18*** | (2006.01) |
| ***H01R 24/44*** | (2011.01) |
| *H01R 103/00* | (2006.01) |

(52) U.S. Cl.
CPC *H01P 3/06* (2013.01); *H01B 11/18* (2013.01); *H01B 11/1834* (2013.01); *H01B 11/1856* (2013.01); *H01B 11/1873* (2013.01); *H01R 24/44* (2013.01); *H01R 2103/00* (2013.01)

(58) Field of Classification Search
CPC .......... H01B 11/1856; H01B 11/1873; H01B 11/1834; H01P 3/06; H01P 1/24; H01R 24/44; H01R 2103/00
USPC ........ 248/49, 56, 57, 71; 324/754.11; 174/28, 174/111, 151
See application file for complete search history.

(56) References Cited

U.S. PATENT DOCUMENTS

| | | | | |
|---|---|---|---|---|
| 1,859,390 A | | 5/1932 | Green | |
| 2,428,051 A | * | 9/1947 | Touraton | 174/28 |
| 4,255,616 A | * | 3/1981 | Liotino | 174/151 |

FOREIGN PATENT DOCUMENTS

| | | | | | |
|---|---|---|---|---|---|
| DE | 909588 C | | 4/1954 | |
| DE | 1238528 | * | 4/1967 | H01B 11/1873 |
| DE | 1301848 | * | 8/1969 | H01B 11/1834 |
| DE | 2927190 B1 | | 11/1980 | |
| DE | 3304957 C2 | * | 8/1984 | H01B 11/1856 |
| SU | 556523 A1 | * | 4/1977 | |

* cited by examiner

*Primary Examiner* — Gwendolyn W Baxter
(74) *Attorney, Agent, or Firm* — DeLio, Peterson & Curcio, LLC; Robert Curcio

(57) ABSTRACT

A support disc for supporting high frequency (HF) components, in particular in HF coaxial cables or coaxial plug-in connections, having a support body with a longitudinal bore, additionally having at least one cross-sectional bore.

25 Claims, 2 Drawing Sheets

SUPPORT DISC FOR SUPPORTING HIGH FREQUENCY (HF) COMPONENTS

This application claims priority from PCT Application No. PCT/EP2010/000856 filed Feb. 11, 2010, which claims priority from German Application No. DE 20 2009 003 687.1, filed Mar. 16, 2009.

BACKGROUND OF THE INVENTION

1. Field of the Invention

The invention relates to a support disc for supporting high frequency (HF) components, in particular in HF coaxial cables or coaxial plug connectors.

2. Description of Related Art

Increasingly demanding requirements in terms of the technical parameters of HF and microwave components, in particular for precision measuring technology, require a high quality of the individual assemblies and therefore also of the support discs. In particular, the reflection and transmission properties of terminating resistors, adapters, attenuators or similar depend greatly on the coaxial supporting elements, the so-called support discs.

Different types of support discs are known in practice. One of these support discs has eight longitudinal bores completely penetrating the support body of the support disc. The manufacture of such a support disc requires numerous manufacturing steps, so that the manufacturing costs of such a disc are relatively high. Another support disc known in practice is manufactured as an injection-molded part with relatively complicated geometry, wherein the support body is pressed into an outer retaining ring. This support body has cross-shaped ribs which are roughly V- or U-shaped in cross-section and is therefore structured in a similar way to a fan. This support disc too is relatively complex to manufacture and consequently expensive. It possesses good electrical properties, but displays disadvantageous temperature behavior, since it can only be used up to a maximum temperature of around 85° C.

SUMMARY OF THE INVENTION

Bearing in mind the problems and deficiencies of the prior art, it is therefore an object of the present invention to provide a support disc of the aforementioned type which, on the one hand, can be manufactured economically and, on the other hand, is improved in terms of its electrical properties.

The above and other objects, which will be apparent to those skilled in the art, are achieved in the present invention which is directed to a support disc for supporting high frequency (HF) components including a support body possessing a longitudinal bore, said support body additionally including at least one transverse bore in the material for adaptation of the characteristic impedance.

The support disc may have the longitudinal bore arranged centrally in the support body and the at least one transverse bore penetrating completely through the support body and its longitudinal bore. The at least one transverse bore may comprise a blind bore.

The support disc may also include two transverse bores arranged at 90° to one another.

The support body may include an annular groove on its front and rear side and may be enclosed circumferentially by a retaining ring.

An inner ring may be fitted in the longitudinal bore of the support body. The inner ring may be penetrated, or not penetrated, by the at least one transverse bore.

The support body may be manufactured of a dielectric material.

The ratio of the inner diameter of the transverse bore to the thickness of the support body may be approximately 0.25 to 0.6, and more particularly 0.46 to 0.47.

BRIEF DESCRIPTION OF THE DRAWINGS

The features of the invention believed to be novel and the elements characteristic of the invention are set forth with particularity in the appended claims. The FIGS. are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
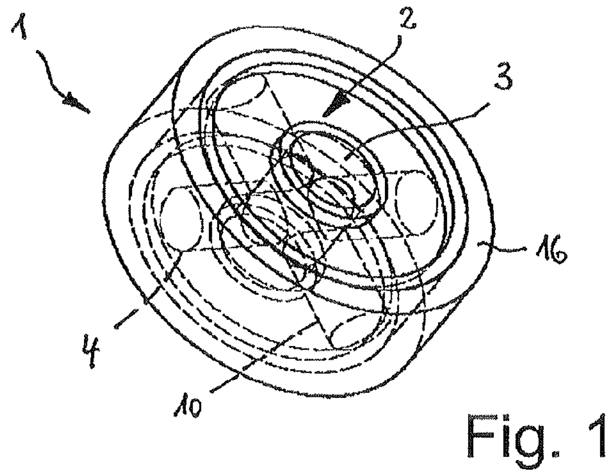
FIG. 1 shows a diagrammatic, perspective view of a support disc for supporting HF components, in particular HF coaxial cables.

In describing the preferred embodiment of the present invention, reference will be made herein to FIGS. 1-7 of the drawings in which like numerals refer to like features of the invention.

According to the invention, in addition to its longitudinal bore the support body possesses at least one transverse bore. This at least one transverse bore leads to an extraordinary improvement in the high frequency properties. An optimum characteristic impedance of the support disc over the entire frequency range makes possible a very good adaptation to the impedance of the HF components which are to be supported. At the same time, the support disc in accordance with the invention also displays particularly good mechanical strength, since sufficient material is available to provide a durable, planar support. The support disc in accordance with the invention therefore fully satisfies both the mechanical and the electrical requirements.

Advantageously, the longitudinal bore is arranged centrally within the support body and completely penetrates the at least one transverse bore of the support body and its longitudinal bore. This allows a good mechanical strength, combined with good electrical properties, to be achieved at a relatively economical price. The good electrical properties make possible a relatively low reflection and a high transmission of the electrical signals and thus high efficiency in transmitting these signals from one HF component to another.

According to an advantageous embodiment of the invention, the at least one transverse bore is designed as a blind bore. This makes it possible to adapt the electrical properties of the support disc exactly to the desired values. It is also possible to combine one or more continuous transverse bores with one or more transversely running blind bores on the same support disc.

According to another embodiment of the invention, two transverse bores are provided which are preferably arranged at 90° to one another. Such a support disc is relatively simple to manufacture and, due to its good mechanical and electrical properties, can be used in a particularly advantageous manner.

Advantageously, the support body has an annular groove of its front and rear side. This serves primarily to make possible an electrical fine tuning of the electrical parameters of the support disc in a simple manner.

According to a preferred embodiment of the invention, the support body is enclosed circumferentially by a retaining ring, into which the support body is preferably pressed. This securely fixes the support body in the retaining ring, so that the entire support disc can be of sealed construction in a longitudinal direction and, with corresponding coloration of the internal structure, can for example additionally protect the relevant HF components against incident light. For example, the support body according to the invention has sufficient material on its circumferential outer surface to guarantee the mechanical strength on the inner diameter of the retaining ring, also referred to as the external conductor ring. In addition to good electrical properties, such a support disc therefore also guarantees good mechanical stability, which has a positive effect on the service life of the support disc and thus on all of the HF components.

According to another embodiment of the invention, an inner ring is fitted in the longitudinal bore of the support body which is penetrated or not penetrated by the at least one transverse bore. Both variants are possible, either separately or in combination. Such an inner ring can be specially adapted to the diameter of the inner conductor, for example, of an HF coaxial cable which is to be accommodated, and to the desired electrical properties which the support disc is required to display. The inner conductor can lie in surface contact with the inner ring and therefore be particularly well supported. A loose connection between the inner conductor and the support disc is thus reliably prevented.

According to another preferred embodiment of the invention, the support body is manufactured of a dielectric material, preferably polystyrene, particularly preferably of a radiation-crosslinked polystyrene. Such a support disc also displays a particularly good temperature behavior and thus a high level of efficiency. Such a disc can therefore be used particularly advantageously for higher power levels. It is particularly suitable for applications over a wide temperature range.

Advantageously, the ratio between the inner diameter of the at least one transverse bore to the thickness of the support body is around 0.25 to 0.6, preferably 0.46 to 0.47. With such a structure, the support disc according to the invention is simple to manufacture and install. It allows good electrical and thermal properties to be realised, so that such a support disc can also be used for higher frequencies and power levels.

Exemplary embodiments of the subject matter of the invention are explained in more detail in the following with reference to the drawings, whereby all the features which are described and/or graphically represented, on their own or in any combination, form the subject matter of the present invention, irrespective of their combination in the claims or their reference to other features.

FIG. 1 shows a diagrammatic, perspective view of a support disc 1 for supporting high frequency (HF) components, in particular in HF coaxial cables or coaxial plug connectors, which are not shown in detail.

Figure 2:
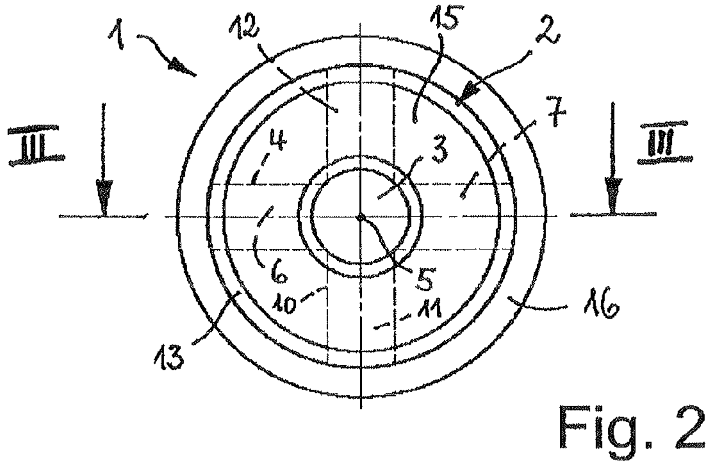
FIG. 2 shows a diagrammatic top view of the support disc according to FIG. 1.

According to a top view of the support disc 1 according to FIG. 1 which is shown in FIG. 2, this has a support body 2 which possesses a longitudinal bore 3. For example, the inner conductor, not shown in detail, of a coaxial cable or coaxial plug connector (also not shown) is plugged into the longitudinal bore 3.

Figure 3:
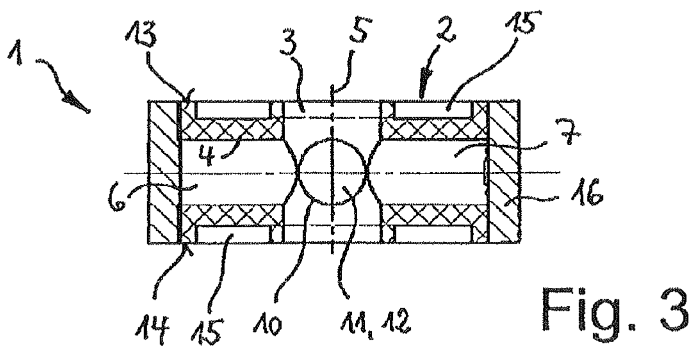
FIG. 3 shows a section along the line III-III in FIG. 2.

According to the invention, the support body 2 has, in addition, at least one transverse bore 4, which is indicated by broken lines in FIGS. 1 and 2, and shown in more precise detail in the section III-III in FIG. 3.

The support disc 1 and support body 2 have a longitudinal axis 5. According to FIGS. 1 to 3 the longitudinal bore 3 is arranged centrally in the support body 2. The at least one transverse bore 4 penetrates completely through the support body 2 and its longitudinal bore 3. Thus, the at least one transverse bore 4 shown in FIGS. 2 and 3 has a left-hand section 6 and a right-hand section 7. The right-hand section 7 and left-hand section 6 are aligned with one another. It is also possible that the sections are not aligned with one another and therefore belong to different transverse bores.

According to another embodiment of the invention, which is not shown, the at least one transverse bore is designed as a blind bore. It is possible to provide both continuous and blind transverse bores in the same support disc.

As indicated in FIGS. 1 to 5, according to a preferred embodiment of the invention two transverse bores 4, 10 are provided which are preferably arranged at 90° to one another. The second transverse bore 10 also has two sections 11, 12, which are aligned with one another.

The support body 2 has an annular groove 15 on its front side 13 and on its rear side 14, as is shown, in particular, in FIG. 3.

As is shown, in particular, in FIG. 3, the support body 2 is enclosed circumferentially by a retaining ring 16, also referred to as an external conductor ring. The support body 2 and retaining ring 16 are so dimensioned that the support body can be pressed into the retaining ring and is held firmly in the latter.

According to another embodiment of the invention, which is not shown, an inner ring is fitted in the longitudinal bore of the support body which can also be penetrated by the at least one transverse bore. It is also possible that the at least one transverse bore does not penetrate the inner ring.

According to another preferred embodiment of the invention, the support body 2 is manufactured of a dielectric material, preferably polystyrene, particularly preferably of a radiation-crosslinked polystyrene. A support body made of such a material displays good dielectric properties which are comparable with those of polyethylene and polytetrafluoroethylene.

The ratio of the inner diameter 17 of the at least one transverse bore 4 to the thickness 20 of the support body 2 is around 0.25 to 0.6, preferably 0.46 to 0.47.

Figure 4:
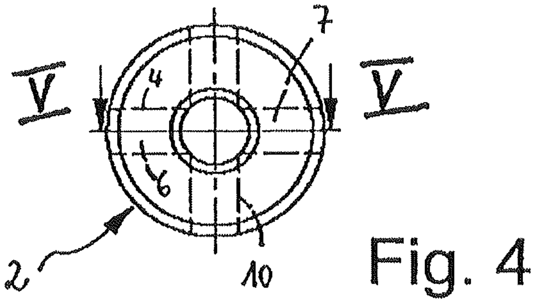
FIG. 4 shows a diagrammatic top view of a support body of the support disc.
Figure 5:
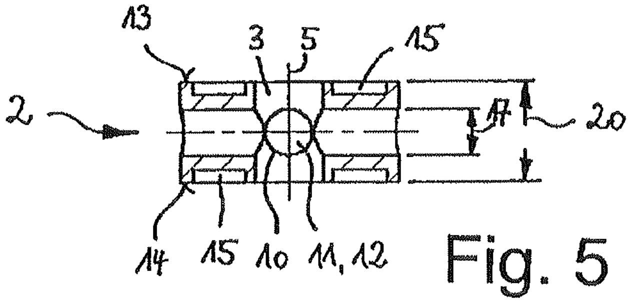
FIG. 5 shows a section along the line V-V in FIG. 4.
Figure 6:
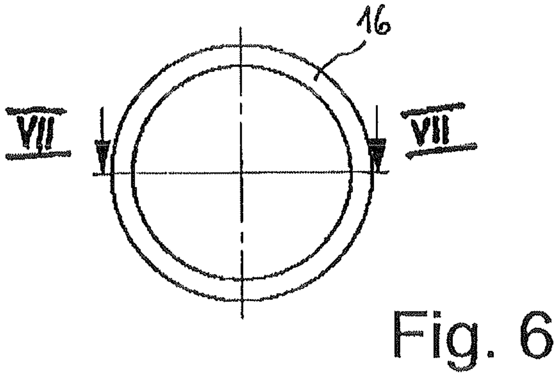
FIG. 6 shows a diagrammatic top view of a retaining ring of the support disc.
Figure 7:
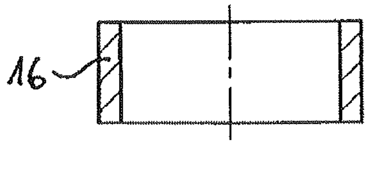
FIG. 7 shows a section along the line VII-VII in FIG. 6.

FIG. 4 shows a top view of the support body 2 of the support disc 1, the section V-V of which is illustrated in FIG. 5. FIG. 6 also shows a top view of the retaining ring 16, the section VII-VII of which is represented in FIG. 7.

As mentioned above, the dimensions of the support body 2 and retaining ring 16 are chosen in such a way that the support body pressed into the retaining ring is held in a fixed position in the retaining ring, so that a relative movement between the support body and retaining ring is ruled out.

Aligned sections of transverse bores can be bored in the support body in one or several working steps, in the first case in that the entire support body is bored through, in the second case in that two transverse bores are provided which each only partially pass through the support body.

A support disc is therefore created which can be manufactured extremely economically and which can be used particularly advantageously.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A support disc for supporting high frequency (HF) components including a support body possessing a longitudinal bore, and at least one transverse bore in the material, wherein the at least one transverse bore is provided for adaptation of the characteristic impedance of the support disc to the impedance of the HF component which is to be supported, said support disc including the longitudinal bore being arranged centrally in the support body and the at least one transverse bore penetrating completely through the support body and its longitudinal bore.

2. The support disc of claim 1 wherein the at least one transverse bore comprises a blind bore.

3. The support disc of claim 1 including two transverse bores arranged at 90° to one another.

4. The support disc of claim 3 wherein the support body includes an annular groove on its front and rear side.

5. The support disc of claim 4 wherein the support body is enclosed circumferentially by a retaining ring.

6. The support disc of claim 5 including an inner ring fitted in the longitudinal bore of the support body.

7. The support disc of claim 6 wherein the inner ring is penetrated, or not penetrated, by the at least one transverse bore.

8. The support disc of claim 6 wherein the support body is manufactured of a dielectric material.

9. The support disc of claim 8 wherein said dielectric material is polystyrene or a radiation-crosslinked polystyrene.

10. The support disc of claim 8 including the ratio of the inner diameter of the transverse bore to the thickness of the support body being approximately 0.25 to 0.6.

11. The support disc of claim 8 including the ratio of the inner diameter of the transverse bore to the thickness of the support body being approximately 0.46 to 0.47.

12. The support disc of claim 5 wherein the support body is manufactured of a dielectric material.

13. The support disc of claim 12 wherein said dielectric material is polystyrene or a radiation-crosslinked polystyrene.

14. The support disc of claim 3 including an inner ring fitted in the longitudinal bore of the support body.

15. The support disc of claim 1 wherein the support body includes an annular groove on its front and rear side.

16. The support disc of claim 1 wherein the support body is enclosed circumferentially by a retaining ring.

17. The support disc of claim 16 wherein the support body is pressed into the retaining ring.

18. The support disc of claim 1 including an inner ring fitted in the longitudinal bore of the support body.

19. The support disc of claim 18 wherein the inner ring is penetrated, or not penetrated, by the at least one transverse bore.

20. The support disc of claim 1 wherein the support body is manufactured of a dielectric material.

21. The support disc of claim 20 wherein said dielectric material is polystyrene or a radiation-crosslinked polystyrene.

22. The support disc of claim 1 including the ratio of the inner diameter of the transverse bore to the thickness of the support body (2) being approximately 0.25 to 0.6.

23. The support disc of claim 1 wherein said high frequency components include HF coaxial cables or coaxial plug connectors.

24. The support disc of claim 1 including the ratio of the inner diameter of the transverse bore to the thickness of the support body being approximately 0.25 to 0.6.

25. The support disc of claim 1 including the ratio of the inner diameter of the transverse bore to the thickness of the support body being approximately 0.46 to 0.47.

* * * * *